United States Patent
Haga et al.

(10) Patent No.: US 12,008,834 B2
(45) Date of Patent: Jun. 11, 2024

(54) ULTRASONIC SENSOR DEVICE AND METHOD OF CONTROLLING THE SAME

(71) Applicant: Shanghai Tianma Micro-Electronics Co., Ltd., Shanghai (CN)

(72) Inventors: Hiroshi Haga, Kanagawa (JP); Shin Takeuchi, Kanagawa (JP); Kenji Sera, Kanagawa (JP); Kenichi Hayashi, Kanagawa (JP); Feng Lu, Shanghai (CN); Haochi Yu, Shanghai (CN); QiJun Yao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 18/322,343

(22) Filed: May 23, 2023

(65) Prior Publication Data
US 2023/0386246 A1 Nov. 30, 2023

(30) Foreign Application Priority Data
May 26, 2022 (JP) ................ 2022-086116

(51) Int. Cl.
*G06V 40/13* (2022.01)
*G06V 40/12* (2022.01)

(52) U.S. Cl.
CPC ...... *G06V 40/1306* (2022.01); *G06V 40/1365* (2022.01)

(58) Field of Classification Search
CPC ............... G06V 40/1306; G06V 40/1365
See application file for complete search history.

(56) References Cited

U.S. PATENT DOCUMENTS

| | | |
|---|---|---|
| 2017/0110504 A1* | 4/2017 | Panchawagh .......... H10N 39/00 |
| 2018/0031686 A1 | 2/2018 | Kuo et al. |
| 2018/0046836 A1 | 2/2018 | Hinger |
| 2018/0260602 A1 | 9/2018 | He et al. |
| 2019/0354209 A1* | 11/2019 | Tang .................. G01S 15/8925 |
| 2020/0167537 A1* | 5/2020 | Lee ........................ G06F 21/32 |
| 2021/0019488 A1* | 1/2021 | Chau .................. G06V 40/1329 |

* cited by examiner

*Primary Examiner* — Premal R Patel
(74) *Attorney, Agent, or Firm* — NIXON & VANDERHYE

(57) ABSTRACT

An ultrasonic sensor device includes a plurality of pixels each including an ultrasonic transducer, and a control circuit configured to control the plurality of pixels. Each of the plurality of pixels is configured to hold a signal received by the ultrasonic transducer therein and send the signal to the control circuit as a response signal. The control circuit is configured to acquire an excitation response signal, which is a response signal sent from a pixel after the ultrasonic transducer therein is excited, acquire a non-excitation response signal, which is a response signal sent from a pixel when the ultrasonic transducer therein is not excited, and correct the excitation response signal based on the non-excitation response signal.

8 Claims, 14 Drawing Sheets

ULTRASONIC SENSOR DEVICE AND METHOD OF CONTROLLING THE SAME

CROSS-REFERENCE TO RELATED APPLICATIONS

This non-provisional application claims priority under 35 U.S.C. § 119(a) on Patent Application No. 2022-086116 filed in Japan on May 26, 2022, the entire content of which is hereby incorporated by reference.

BACKGROUND

This disclosure relates to an ultrasonic sensor device and a method of controlling the ultrasonic sensor device.

Ultrasonic sensors are used in various fields such as nondestructive testing of an object, object detection, and fingerprint reading. For example, ultrasonic fingerprint sensors such as integrated micro-electro-mechanical system (MEMS) ultrasonic fingerprint sensors utilizing MEMS technology and thin-film transistor (TFT) ultrasonic sensors have been developed. These fingerprint sensors include a pixel array composed of two-dimensionally arrayed pixels and each pixel includes an ultrasonic transducer.

An example of an ultrasonic transducer is a piezoelectric element. The ultrasonic transducer in a pixel can be composed of one element capable of sending and receiving ultrasound or a pair of a transmitter for sending ultrasound and a receiver for receiving ultrasound. Specifically, the ultrasonic transducer emits ultrasound in response to an electric signal, and also receives ultrasound reflected off an object and converts the received ultrasound into an electric signal.

SUMMARY

An ultrasonic sensor device according to an aspect of this disclosure includes a plurality of pixels each including an ultrasonic transducer, and a control circuit configured to control the plurality of pixels. Each of the plurality of pixels is configured to hold a signal received by the ultrasonic transducer therein and send the signal to the control circuit as a response signal. The control circuit is configured to acquire an excitation response signal, which is a response signal sent from a pixel after the ultrasonic transducer therein is excited, acquire a non-excitation response signal, which is a response signal sent from a pixel when the ultrasonic transducer therein is not excited, and correct the excitation response signal based on the non-excitation response signal.

An aspect of this disclosure is a method of controlling an ultrasonic sensor device including a plurality of pixels each including an ultrasonic transducer. The method includes: acquiring an excitation response signal, which is a response signal sent from a pixel after the ultrasonic transducer therein is excited; acquiring an non-excitation response signal, which is a response signal sent from the pixel when the ultrasonic transducer therein is not excited; and correcting the excitation response signal based on the non-excitation signal.

It is to be understood that both the foregoing general description and the following detailed description are exemplary and explanatory and are not restrictive of this disclosure.

EMBODIMENTS

Figure 1:
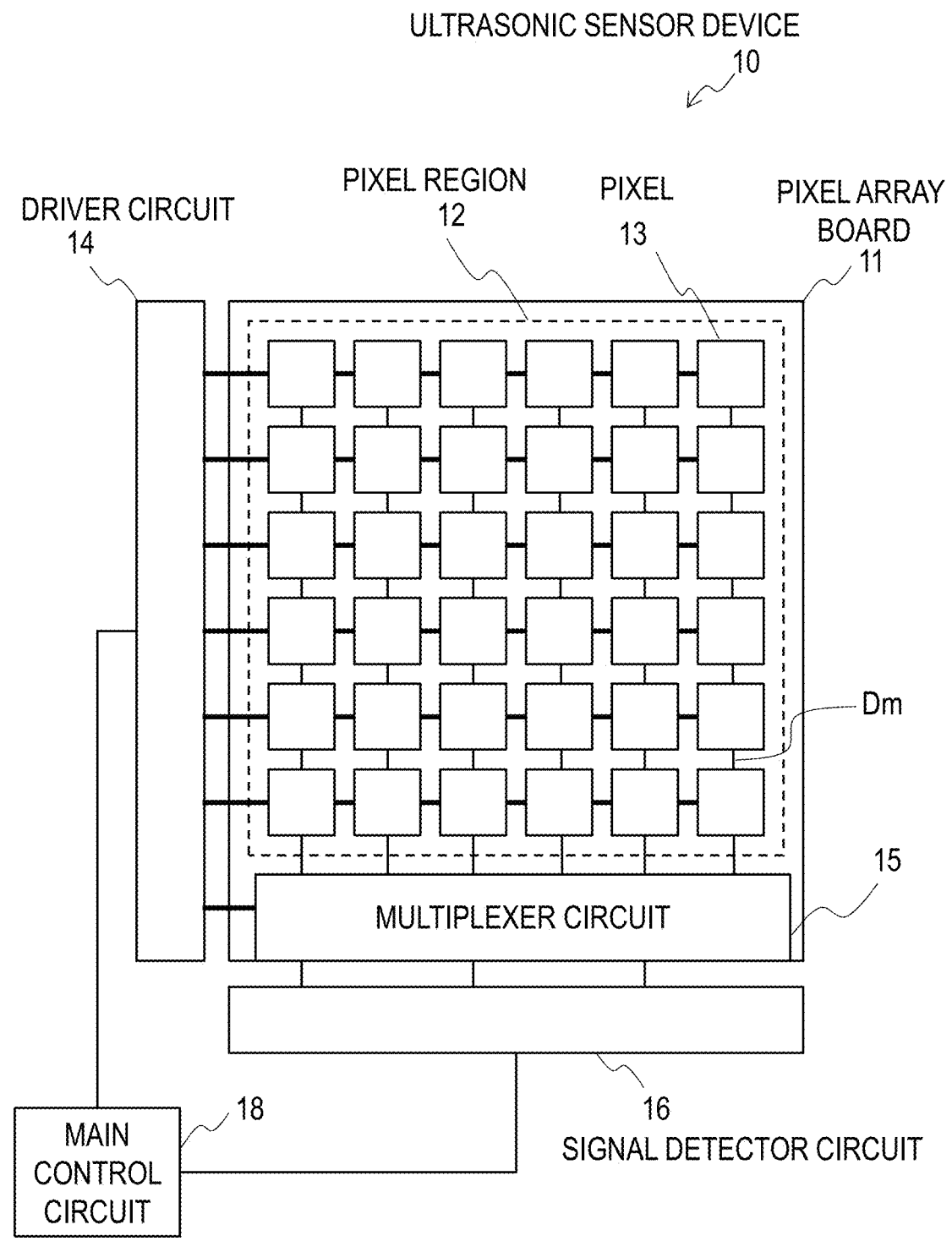
FIG. 1 is a block diagram illustrating a configuration of an ultrasonic sensor device in an embodiment.

Hereinafter, an ultrasonic sensor device of this disclosure will be described in detail with reference to the drawings. The elements in each drawing are changed in size or scale as appropriate to be well recognized in the drawing. The hatches in the drawings are to distinguish the elements and are not to necessarily represent cross-sections. The non-linear elements used as switching elements or amplifying elements are referred to as transistors. The transistors include thin-film transistors (TFTs).

The ultrasonic sensor device of this disclosure is applicable to the fields of medical and industrial testing and to detect a fingerprint or an object. An ultrasonic sensor device in an embodiment of this specification includes a pixel array composed of a plurality of arrayed pixels. The pixel array is composed of pixels disposed in one dimension or two dimensions.

Each pixel includes an ultrasonic transducer. The ultrasonic transducer sends and receives ultrasound. The ultrasonic transducer can be composed of one element capable of sending and receiving ultrasound or a pair of a transmitter for sending ultrasound and a receiver for receiving ultrasound. Ultrasound has a frequency higher than 20 kHz, or a frequency above the hearing range. The frequency of the ultrasound is selected appropriately for the field and the situation of use and can be 5 MHz, for example. A still higher frequency, for example 20 MHz or 1000 MHz, can be selected to increase the straightness of the ultrasound.

The ultrasonic transducer in an embodiment of this specification is a piezoelectric element. The piezoelectric material of the piezoelectric element can be either inorganic or organic. The ultrasonic transducer generates ultrasound in response to an electric signal from a control circuit and convers received ultrasound into an electric signal. The pixel holds the electric signal converted by the ultrasonic transducer. The signal received and converted by the ultrasonic transducer is sent from the pixel to the control circuit as a response signal.

The inventors' research revealed that the signal from a pixel including an ultrasonic transducer for sending and receiving ultrasound tends to have a low S/N ratio. The inventors found occurrence of problems such as large low-frequency noise and large variation in signal among measurement trials.

An embodiment of this specification acquires a response signal after exciting the ultrasonic transducer and further acquires a response signal without exciting the ultrasonic transducer. The response signal after excitation is corrected with the response signal without excitation. This operation effectively removes the noise from the response signal after excitation to achieve more accurate sensing the object. In the following description, the response signal after excitation may be referred to as excitation response signal and the response signal without excitation as non-excitation response signal.

Device Configuration

FIG. 1 is a block diagram illustrating a configuration example of an ultrasonic sensor device in an embodiment of this specification. The ultrasonic sensor device 10 includes a pixel array board 11 and control circuits. The control circuits include a multiplexer circuit 15, a driver circuit 14, a signal detector circuit 16, and a main control circuit 18. One or more of these circuits can be excluded or another circuit can be added. Moreover, one or more functions of one circuit can be included in another circuit.

The pixel array board 11 includes an insulating substrate (such as a glass substrate) and a pixel region 12 in which pixels 13 are aligned horizontally and vertically like a matrix on the insulating substrate. The pixel array in this example is composed of pixels disposed in two dimensions but the pixel array can be composed of pixels disposed in one dimension.

The multiplexer circuit 15 is fabricated on the insulating substrate of the pixel array board 11 and connected to signal lines Dm for pixel columns disposed vertically in FIG. 1. The multiplexer circuit 15 converts signals from the pixels in time series and outputs the converted signals to a smaller number of signal lines connected to the signal detector circuit 16 for detection.

The driver circuit 14 drives and controls the pixels 13 to send and receive ultrasound. The multiplexer circuit 15 receives an ultrasound detection signal from a pixel 13 transmitted by a signal line Dm and outputs it to the signal detector circuit 16. The signal detector circuit 16 detects signals from individual signal lines converted in time series by the multiplexer circuit 15.

The main control circuit 18 controls the driver circuit 14, the multiplexer circuit 15, and the signal detector circuit 16. The main control circuit 18 acquires and processes response signals output from individual pixels 13. In an embodiment of this specification, the main control circuit 18 corrects the excitation response signal from each pixel with the non-excitation response signal. The details of the processing on the response signal from each pixel will be described later. The driver circuit 14, the signal detector circuit 16, and the main control circuit 18 can be mounted on the pixel array board 11 or provided separately from the pixel array board 11 as independent components.

Pixel Configuration

Figure 2:
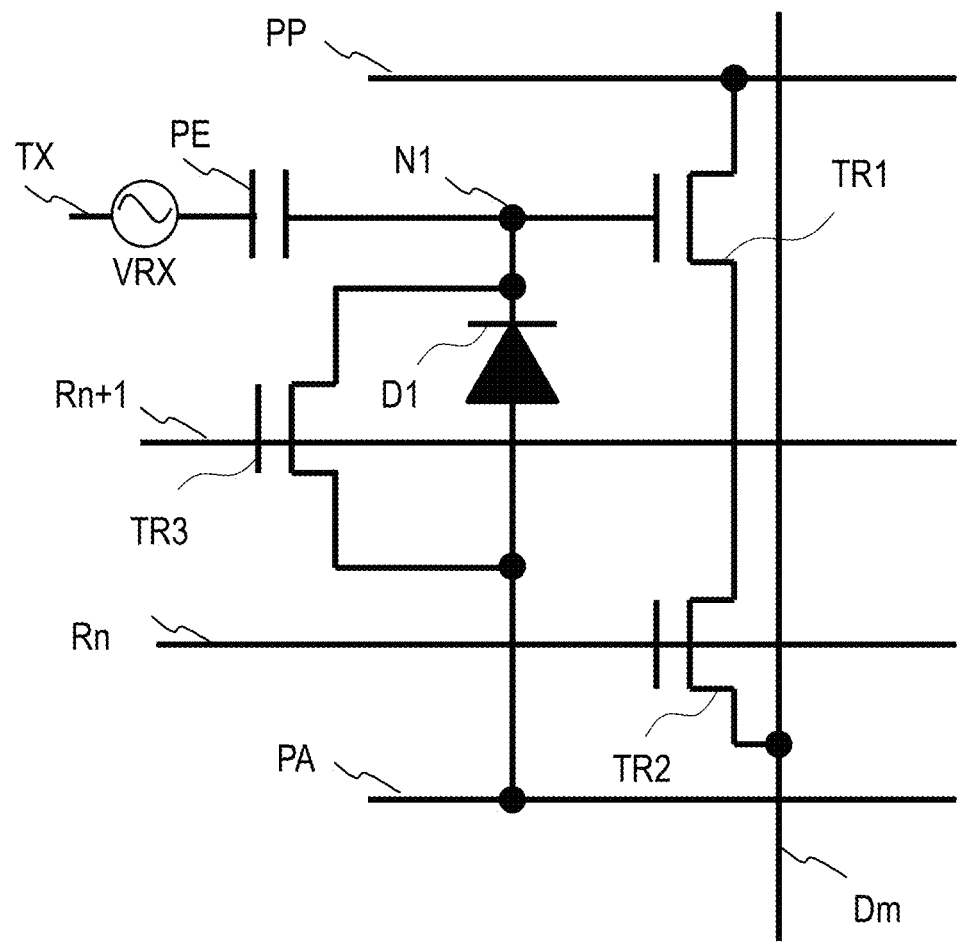
FIG. 2 is a circuit diagram illustrating a circuit configuration of a pixel on a pixel array board in an embodiment.

FIG. 2 illustrates a circuit configuration of a pixel 13. The pixel 13 includes a piezoelectric element PE of an ultrasonic transducer. This piezoelectric element PE has two functions to generate and receive ultrasound. One of the electrodes of the piezoelectric element PE is denoted by a reference sign TX. The electrode TX may be referred to as sending electrode and the other electrode as receiving electrode. In the example of the element configuration described later, the electrode TX is an upper electrode and the other electrode is a lower electrode. The side farther from the insulating substrate is defined as upper side and the side closer from the insulating substrate as lower side.

The piezoelectric element PE induces a voltage VRX in accordance with received ultrasonic vibration. One pixel circuit in the ultrasonic sensor device 10 of this disclosure includes three thin-film transistors TR1, TR2, and TR3, and a diode D1. The semiconductor material of the thin-film transistors can be low-temperature polysilicon, an oxide semiconductor, or amorphous silicon.

The cathode terminal of the diode D1 is connected to a node N1 between the gate terminal of the transistor TR1 and a source/drain terminal of the transistor TR3. The anode terminal is connected to a diode bias line PA. One of the source/drain terminals of the transistor TR1 is connected to a power line PP and the other source/drain terminal is connected to one of the source/drain terminals of the transistor TR2.

The gate terminal of the transistor TR2 is connected to a control line Rn. The other source/drain terminal of the transistor TR2 is connected to a signal line Dm. The gate terminal of the transistor TR3 is connected to a control line Rn+1. The signal transmitted by the control line Rn+1 is the same as the signal transmitted by the control line Rn for the next pixel row. The source/drain terminals of the transistor TR3 are connected to the anode terminal and the cathode terminal of the diode D1.

The transistor TR1 (amplifier transistor) has a function to amplify the potential at one end of the piezoelectric element PE. The transistor TR2 is a switching element and has a function to control the output from the pixel circuit. The transistor TR3 is a switching element and has a function to reset the potentials of the one end of the piezoelectric element PE and the gate electrode of the transistor TR1 (the node N1).

The ultrasonic sensor device 10 in FIG. 1 has one signal line Dm per pixel column consisting of a plurality of vertically aligned pixels 13. All pixels 13 in the same pixel column are connected to one signal line Dm. This signal line Dm is connected to one multiplexer circuit 15 in an end region of the pixel array board 11.

Element Structure

Figure 3:
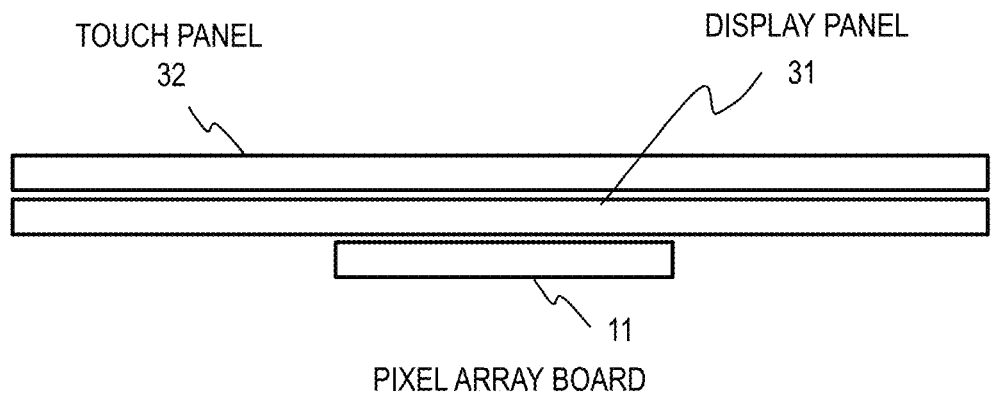
FIG. 3 illustrates a configuration example of a terminal including an ultrasonic sensor device.

FIG. 3 schematically illustrates a configuration example of a terminal including the pixel array board 11 in an embodiment of this specification. The terminal includes the pixel array board 11, a display panel 31, and a touch panel 32 laid one above another. The touch panel 32 can employ any type of touch detection scheme such as capacitive type or resistive type. The display panel 31 can be an organic light-emitting diode (OLED) display panel or another type of display panel. The display panel 31 and the touch panel 32 can be controlled by the main control circuit 18 together with the pixel array board 11.

The positional relation among the pixel array board 11, the display panel 31, and the touch panel 32 is not limited to the example of FIG. 3 and can be determined desirably. For example, the pixel array board 11 and the display panel 31 do not overlap each other and they are disposed on the same side or different sides of the touch panel 32 to be distant from each other within a plane (when viewed in the layering direction). The terminal can include a layered structure of the display panel and a touch panel separately from a layered structure of the pixel array of the ultrasonic sensor device and another touch panel. The pixel array board 11 does not need to be laid on another functional panel such as a display panel or a touch panel.

Figure 4:
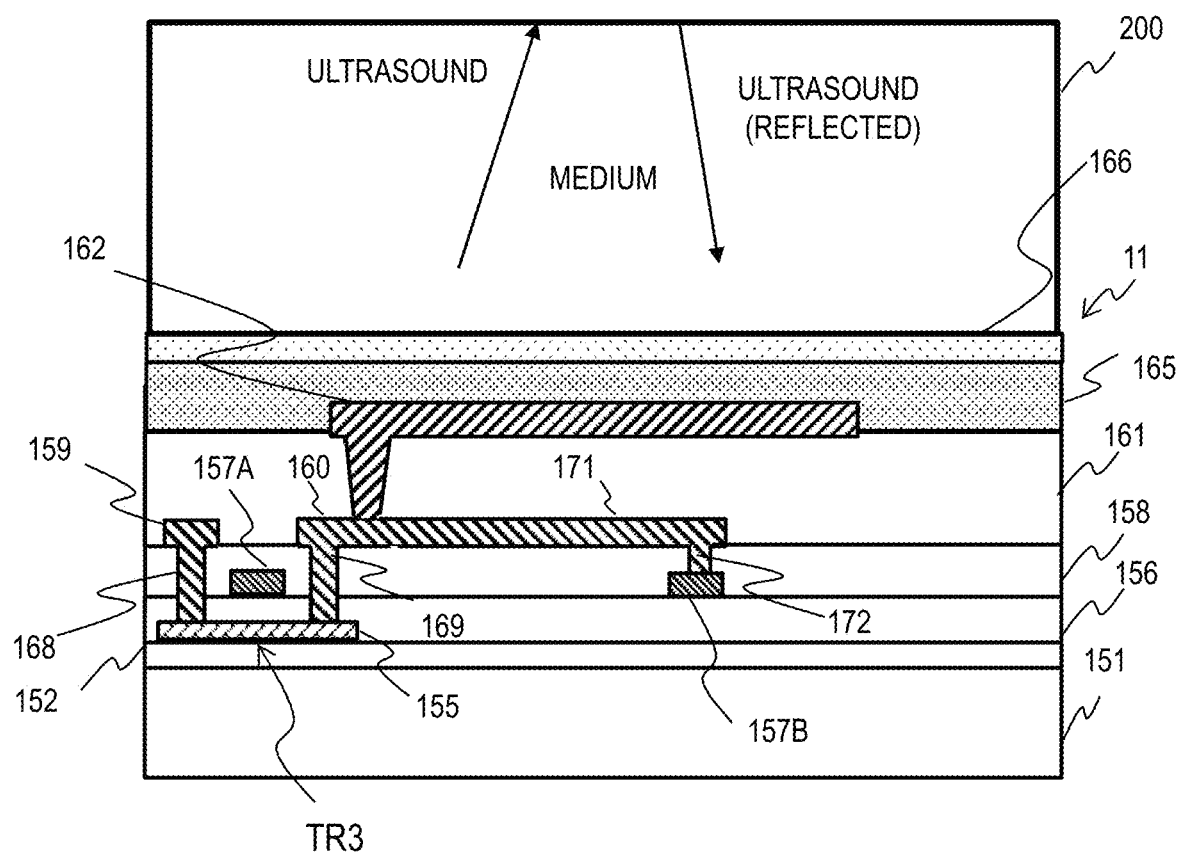
FIG. 4 schematically illustrates a cross-sectional structure of a part of one pixel.

FIG. 4 schematically illustrates a cross-sectional structure of a part of one pixel. The definitions of top and bottom in the following description correspond to the top and the bottom of the drawing. The pixel array board 11 includes an insulating substrate 151 and a medium 200 opposed to the insulating substrate 151. The medium 200 is a flexible or rigid insulating substrate made of resin or glass, for example. As illustrated in FIG. 3, a layered structure of a display panel and/or a touch panel that does not interfere with the ultrasound can be provided above or in place of the medium 200. A plurality of pixels are arrayed between the insulating substrate 151 and the medium 200.

The ultrasound generated by a piezoelectric element is reflected off the surface of the medium 200 and returns to the piezoelectric element. If an object such as a human skin is in contact with the surface of the medium 200, the reflection rate of the ultrasound changes. Whether a human skin is present (or ridges and grooves of a human skin) can be sensed with the intensity of the reflected ultrasound.

A pixel includes a lower electrode 162, an upper electrode 166, and a piezoelectric material layer 165 on the insulating substrate 151. These constitute a piezoelectric element of an ultrasonic transducer. The piezoelectric material layer 165 is disposed between the upper electrode 166 and the lower electrode 162. The piezoelectric material can be either organic or inorganic; for example, polyvinylidene fluoride (PVDF) or zirconate titanate (PZT) can be employed. Furthermore, a copolymer of vinylidene fluoride ($CH_2CF_2$) and trifluoroethylene ($CF_2CFH$), or P(VDF/TrFE), can be employed.

The upper electrodes 166 of a plurality of pixels in the configuration example of FIG. 4 are different parts of one common electrode. In an embodiment of this specification, the upper electrodes 166 of all pixels in the pixel array are different parts of one common electrode having a shape fully covering the entire pixel region. The same applies to the piezoelectric material layer 165. The lower electrodes 162 are separate among individual pixels. The plurality of lower electrodes 162 are disposed above the top face of a planarization film 161.

The upper electrodes 166 are sending electrodes and the lower electrodes 162 are receiving electrodes. Supplying an excitation signal to the upper electrodes 166 enables the piezoelectric elements of all pixels to simultaneously generate ultrasound and signals unique to the pixels are received at the lower electrodes 162. The upper electrodes and the piezoelectric material layers can be separate for individual pixels.

A pixel includes a circuit including a plurality of switches. The circuit drives and controls a piezoelectric element and it can be referred to as pixel circuit. The pixel circuit is fabricated between the insulating substrate 151 and the layer of the lower electrode 162. The pixel circuit controls the potential of the lower electrode 162 and further, holds the signal received by the lower electrode 162. The configuration example illustrated in FIG. 4 includes the upper electrode 166 on the side to generate ultrasound and receive reflected ultrasound (the upper side of FIG. 4). The layer positions of the piezoelectric element and the circuit can be reversed.

The pixel circuit in FIG. 4 includes a transistor TR3 and the gate electrode 157B of a transistor TR1. The insulating substrate 151 is a rigid or flexible substrate made of glass or resin, for example. An undercoat insulating layer 152 made of an insulator is provided above the insulating substrate 151 and a semiconductor active layer 155 is laid above the undercoat insulating layer 152. The semiconductor active layer 155 includes low-resistive source/drain regions and a highly resistive channel region sandwiched by the source/drain regions.

The semiconductor active layer 155 is covered with a gate insulating layer 156. Gate electrodes are provided above the semiconductor active layer 155 with the gate insulating layer 156 interposed therebetween. FIG. 4 includes the gate electrode 157A of the transistor TR3 and the gate electrode 157B of the transistor TR1. An interlayer insulating film 158 is provided over the layer including the gate electrodes 157A and 157B.

Source/drain electrodes 159 and 160 are provided above the interlayer insulating film 158 within the pixel region 12. The source/drain electrodes 159 and 160 can be made of an aluminum-based alloy. The source/drain electrodes 159 and 160 are connected to the semiconductor active layer 155 through contact regions 168 and 169 provided in contact holes opened through the interlayer insulating film 158 and the gate insulating layer 156.

A line region 171 extends from the source/drain electrode 160 of the transistor TR3 and connects to the gate electrode 157B of the transistor TR1 via a contact region 172 provided in a contact hole of the interlayer insulating film 158. The line region 171 and the source/drain electrode 160 are included in the same metal layer and they are unseparated.

An insulating planarization film 161 is provided over the source/drain electrodes 159 and 160, and the line region 171. A lower electrode 162 is provided above the insulating planarization film 161. The lower electrode 162 is connected to the source/drain electrode 160 via a contact region provided in a contact hole of the planarization film 161. The pixel circuit is fabricated below the lower electrode 162.

A piezoelectric material layer 165 is provided over the lower electrode 162. The piezoelectric material layer 165 is in contact with the top face of the lower electrode 162 and the top face of the planarization film 161. An upper electrode 166 is provided above and in contact with the piezoelectric material layer 165. The lower electrode 162, the piezoelectric material layer 165, and the upper electrode 166 constitute a piezoelectric element.

Reading Excitation Response Signal

Figure 5:
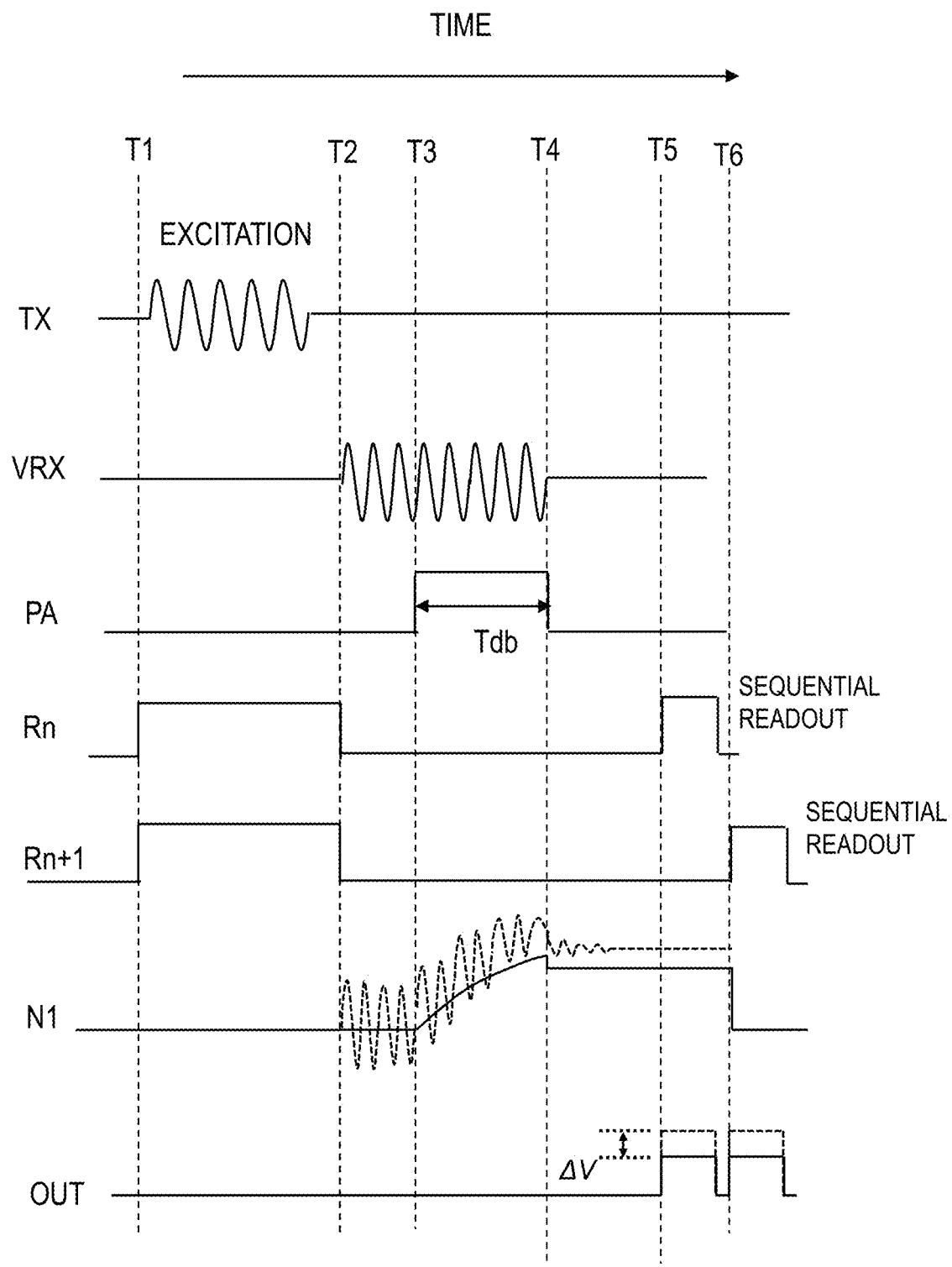
FIG. 5 is a timing chart illustrating an example of sensing operation of the ultrasonic sensor device of this disclosure in one frame (one unit period).

FIG. 5 is a timing chart illustrating an example of sensing operation of the ultrasonic sensor device 10 in one frame (one unit period). The main control circuit 18 controls each pixel 13 to read its response signal in each of consecutive frames. In the operation example described with reference to FIG. 5, the ultrasonic sensor device 10 generates ultrasound in the beginning of a frame and receives reflected ultrasound after stopping the generation of ultrasound.

One frame is a period to read response signals from pixels in at least a part of the pixel array. The operation example described in the following simultaneously drives the piezoelectric elements PE in all pixels to generate ultrasound and sequentially reads response signals from different pixel rows through each data line.

With reference to FIG. 5, the period from a time T1 to a time T2 is an ultrasonic excitation period. At the time T1, the driver circuit 14 changes the potentials of the control lines Rn and Rn+1 from a Low level to a High level. In response, the transistors TR2 and TR3 turn ON. The driver circuit 14 maintains the potential of the diode bias line PA at a Low level. As a result, the potential of the receiving electrode of the piezoelectric element PE (the node N1) is fixed.

After turning ON the transistors TR2 and TR3, the driver circuit 14 supplies an excitation signal to the sending electrode TX of the piezoelectric element PE. In response, the piezoelectric element PE starts vibrating to generate ultrasound. In this example, each of the sending electrodes TX of the piezoelectric elements of all pixels on the pixel array board 11 is a part of one common electrode. Accordingly, the piezoelectric elements of all pixels vibrate simultaneously. Subsequently, the driver circuit 14 stops supplying the signal to the sending electrode TX.

At the time T2 after stopping the signal for the sending electrode TX, the driver circuit 14 changes the potentials of the control lines Rn and Rn+1 from a High level to a Low level. In response, the transistors TR2 and TR3 turn OFF.

The piezoelectric element PE receives reflected ultrasound from the time T2. Since the transistor TR3 is OFF, the receiving electrode of the piezoelectric element is in a floating state, so that an inductive voltage VRX is generated at the piezoelectric element PE in response to receipt of ultrasound. In FIG. 5, if the piezoelectric element PE is not receiving ultrasound, the inductive voltage VRX is 0 and if receiving, the inductive voltage VRX is alternating voltage whose effective value is greater than 0. The potential of the node N1 varies in accordance with the inductive voltage VRX. The node N1 is an output node of the transducer.

At a time T3 later than the time T2, the driver circuit 14 changes the potential of the diode bias line PA from a Low level to a High level. Diode biasing adjusts the potential of the node N1 to an optimum bias voltage for the transistor TR1 to output a response signal to the signal line Dm.

In FIG. 5, the potential variation at the node N1 in the case where the inductive voltage VRX is 0 is represented by a solid line and the potential variation at the node N1 in the case where the inductive voltage VRX is generated is represented by a dashed line. As noted from FIG. 5, the potential of the node N1 varies depending on the inductive voltage VRX and diode biasing. The potential of the node N1 increases in response to diode biasing and further increases in response to the inductive voltage VRX. The period Tdb of diode biasing is an important factor for accurate sensing. This will be described later in detail.

At a time T4 later than the time T3 by the period Tdb, the driver circuit 14 changes the potential of the diode bias line PA from a High level to a Low level. As a result, the potential of the node N1 becomes floating and is maintained at an increased potential. In other words, the pixel holds the signal received by the piezoelectric element of an ultrasonic transducer at the node N1.

The driver circuit 14 supplies a High-level pulse to the control line Rn for the subsequent period from a time T5 to a time T6. As a result, the transistor TR2 turns ON. The transistor TR1 amplifies the signal held at the node N1 and outputs the response signal to the signal line Dm. The driver circuit 14 successively outputs pulses to the control lines Rn for different pixel rows, so that response signals are successively read from the pixels connected to the signal line Dm.

The signal detector circuit 16 receives an output OUT from the data line. The output OUT represents response signals from the successively selected pixels. The response signal from an excited piezoelectric element is higher than the response signal from a non-excited piezoelectric element by A V. The voltage A V is a value based on factors such as the diode bias voltage, the period of diode biasing, and the inductive voltage VRX.

Noise in Excitation Response Signal

Figure 6:
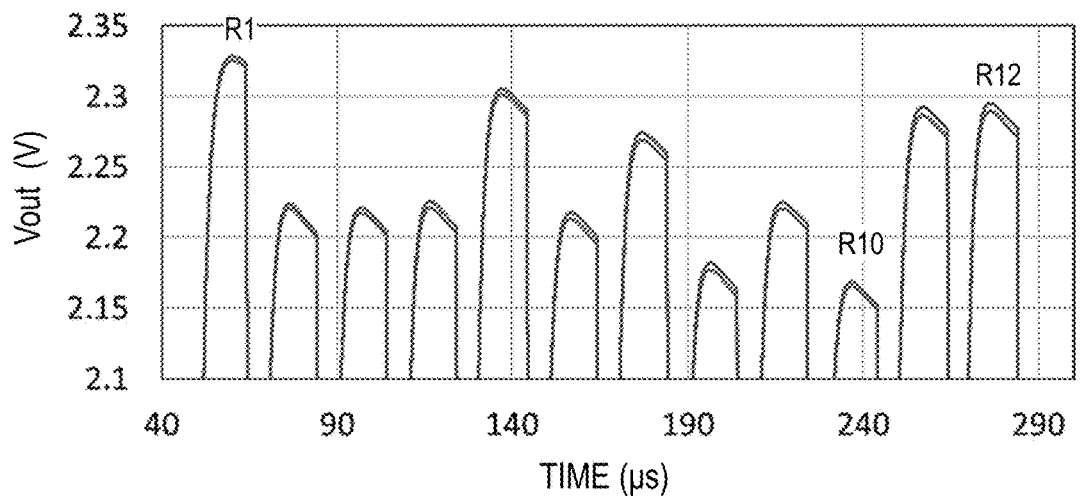
FIG. 6 provides measurement results of excitation response signals in the cases where a sensing target object is present and not present.

Noise in the excitation response signal is described. The excitation response signal is a response signal when the ultrasonic transducer is excited. FIG. 6 provides measurement results of excitation response signals in the cases where a sensing target object is present and not present. The horizontal axis of the graph represents time and the vertical axis represents the voltage of the excitation response signal.

FIG. 6 provides excitation response signals of different pixel rows sequentially read from one data line. The measurement used a silicone cube as the sensing target object. The same applies to the other measurement results to be described later. In the example of a fingerprint sensor device, the excitation response signals from the region where a fingerprint (finger) is in contact with the touch surface exhibit values close to the values in FIG. 6 acquired when the sensing target object is present and the excitation response signals from the region where the fingerprint is away from the touch surface exhibit values close to the values in FIG. 6 acquired when the sensing target object is not present.

Each pulse pair in FIG. 6 indicates a pair of excitation response signals of one pixel row in the cases where the sensing target object is present and not present. For example, the leftmost pulse pair represents the excitation response signals of the first pixel row R1. The tenth and twelfth pulse pairs represent the excitation response signal pairs of the tenth pixel row R10 and the twelfth pixel row R12, respectively. In each pair, the excitation response signal when the object is present is smaller than the excitation response signal when the object is not present.

As noted from FIG. 6, the intensities of the excitation response signals are significantly different among pixel rows. However, the differences in signal intensity between in the cases where the object is present and not present are very small, compared to the intensities of the signals.

Figure 7A:
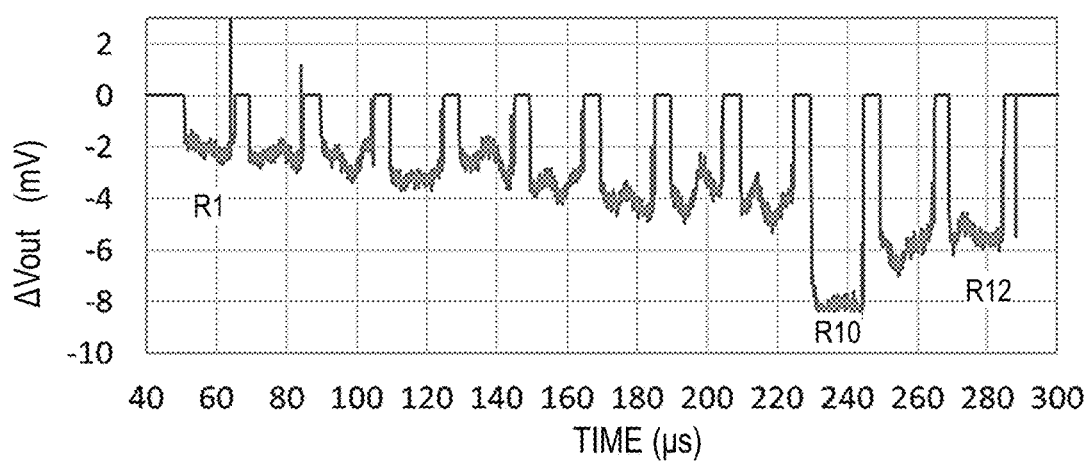
FIG. 7A provides a measurement result on the difference in excitation response signal between in the cases where a sensing target object is present and not present.
Figure 7B:
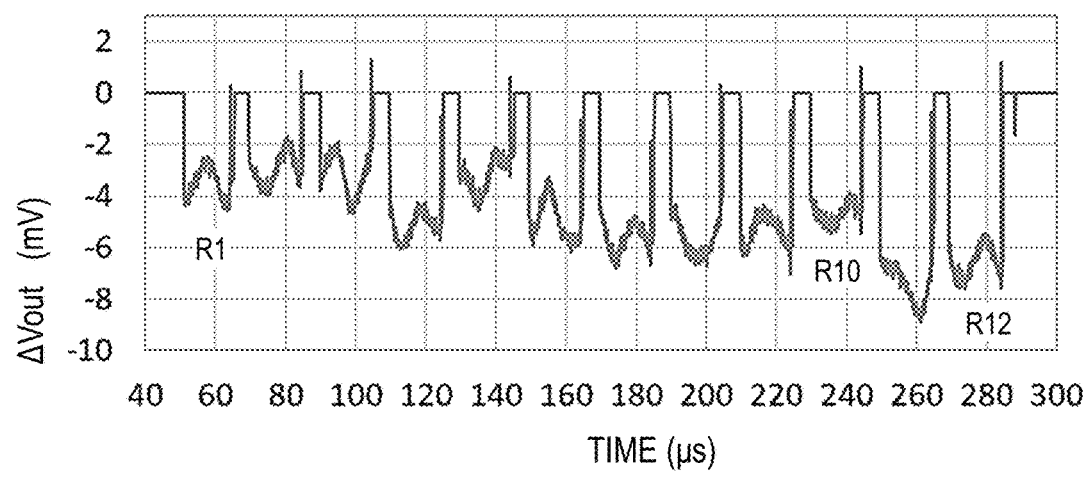
FIG. 7B provides another measurement result on the difference in excitation response signal between in the cases where the sensing target object is present and not present.

FIGS. 7A and 7B provide measurement results on the difference in excitation response signal between in the cases where a sensing target object is present and not present. FIGS. 7A and 7B provide the results of two series of measurement. Each measurement result (value) is the average of the values measured in 1000 frames. Each graph provides the differences between excitation response signals of different pixel rows sequentially read from one data line. The horizontal axis of each graph represents time and the vertical axis represents the difference between excitation response signals. The difference is a value obtained by subtracting the value of the signal when the object is not present from the value of the signal when the object is present.

Each pulse in FIGS. 7A and 7B represents the difference between excitation response signals from one pixel row. For example, the leftmost pulse indicates the difference between the excitation response signals of the first pixel row R1. The tenth and twelfth pulses indicate the differences between excitation response signal pairs of the tenth and the twelfth pixel rows, respectively. Since the excitation response signals in the case where the object is present are smaller than the signals in the case where the object is not present as described above, the values of the pulses are negative values.

As noted from FIGS. 7A and 7B, the difference between excitation response signals of each pixel row is significantly different depending on the measurement. Also, in each series of measurement, the difference between excitation response signals is significantly different depending on the pixel row. Taking an example of the measurement result in FIG. 7A, the absolute value of the difference between excitation response signals of the pixel row R1 is much smaller than the absolute values of the differences between excitation response signals of the pixel rows R10 and R12.

As understood from the above, an excitation response signal includes low-frequency noise. This noise may interfere with accurate sensing by an ultrasonic sensor device. An embodiment of this specification acquires a response signal when the ultrasonic transducer is not excited, namely a non-excitation response signal, and corrects an excitation response signal with the non-excitation response signal. The noise in the excitation response signal can be effectively removed through this operation.

Correction of Response Signal

Figure 8:
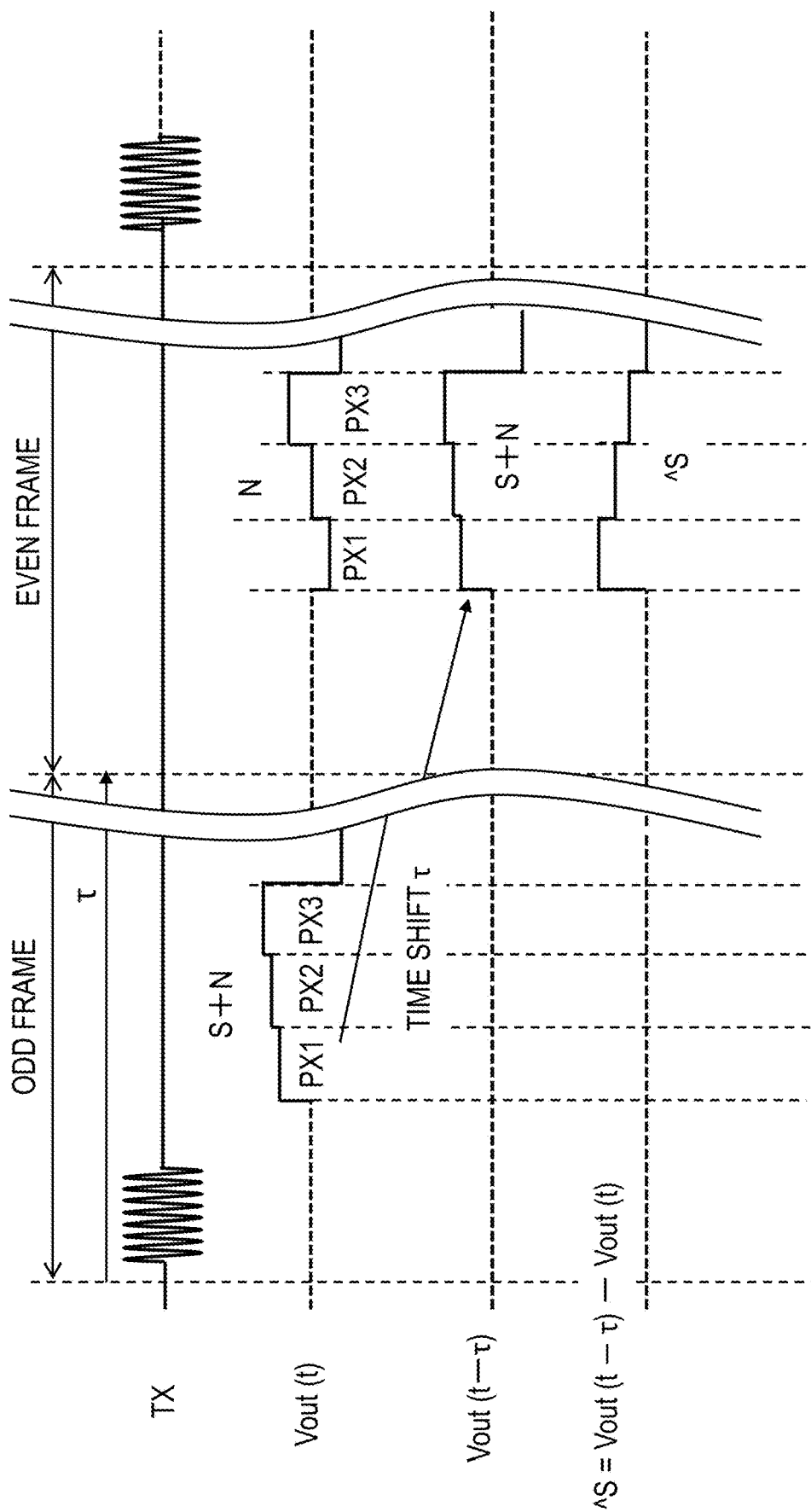
FIG. 8 is a diagram for explaining the operation of correcting an excitation response signal with a non-excitation response signal.

FIG. 8 is a diagram for explaining the operation of correcting an excitation response signal with a non-excitation response signal. FIG. 8 schematically illustrates temporal variation of some signals in two consecutive frames. Specifically, FIG. 8 illustrates temporal variation of a signal supplied to the sending electrodes TX, response signals Vout(t) output from a data line, response signals Vout(t–τ) in the previous frame period, and the differences between the response signals in the two frames (Vout(t–τ)–Vout(t)), where t represents a frame period.

The example in FIG. 8 excites the sending electrodes TX only in the odd frames and does not excite the sending electrodes TX in the even frames. Processing for an odd frame and processing for an even frame are repeated.

Specifically, the main control circuit 18 supplies an excitation signal to the piezoelectric elements to generate ultrasound and subsequently reads response signals Vout(t) from individual pixels in an odd frame. The response signals are excitation response signals. FIG. 8 illustrates reading excitation response signals from three pixels PX1, PX2, and PX3 by way of example. Each excitation response signal includes a true (original) signal S caused by the reflected ultrasound responding to an object (including the case where the object is not present) and noise N.

In the next even frame, the main control circuit 18 reads response signals Vout(t) from individual pixels without supplying an excitation signal to the piezoelectric elements. The response signals are non-excitation response signals. FIG. 8 illustrates reading non-excitation response signals from three pixels PX1, PX2, and PX3 by way of example. Each non-excitation response signal does not include the signal S responding to the object but is composed of only the noise N.

The main control circuit 18 corrects the excitation response signals in the odd frame with the non-excitation response signals in the next even frame to acquire estimated values ˆS of the true signals S. An example of the correction subtracts a non-excitation response signal in the even frame from an excitation response signal in the odd frame in accordance with the following formula:

$$\hat{S} = V\text{out}(t-\tau) - V\text{out}(t),$$

where τ represents a frame period and Vout(t–τ) represents the response signal at the time earlier by one frame period.

As described above, the excitation response signal Vout(t) in an odd frame includes a true signal S and noise N and the non-excitation response signal Vout(t) in an even frame includes only the noise N. The estimated value ˆS of the true signal S can be obtained by subtracting Vout(t) in the even frame from Vout(t) in the odd frame.

Figure 9:
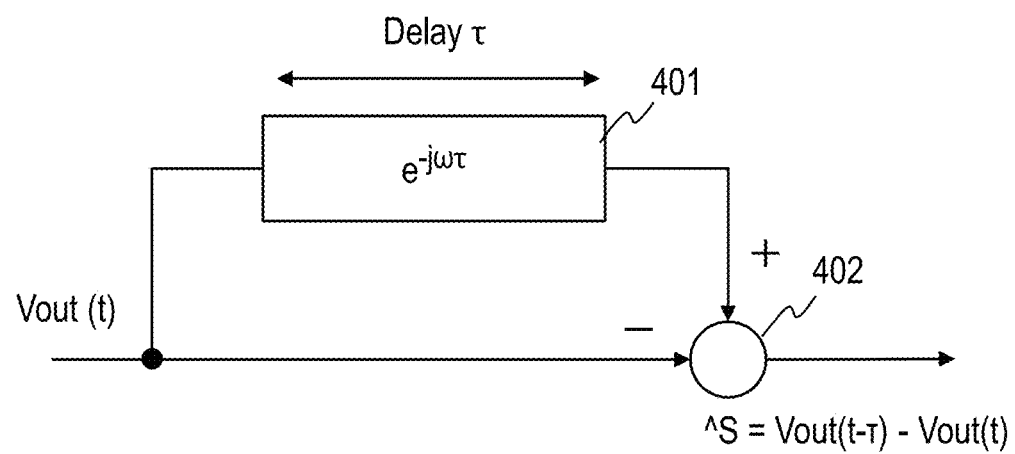
FIG. 9 schematically illustrates a configuration of a comb filter.

This signal processing (ˆS=Vout(t–τ)–Vout(t)) can be performed with a comb filter. FIG. 9 schematically illustrates a configuration of a comb filter. The comb filter includes a delay element 401 and an operator 402. The delay element 401 outputs an input signal with a delay of a time T. The operator 402 outputs a signal obtained by subtracting the input signal from the output signal of the delay element 401. The main control circuit 18 may perform this signal processing with a processor that operates in accordance with a program or a logical circuit configured to implement this arithmetic element.

The comb filter can attenuate low-frequency noise without attenuating the signal component. The above-described correction to an excitation response signal attenuates the DC component and the components of integral multiples of the frame frequency of the noise substantially to zero.

The above-described example corrects an excitation response signal in an odd frame with a non-excitation response signal in the next even frame. Another example can correct an excitation response signal in an even frame with a non-excitation response signal in the next odd frame. Still another example can use a non-excitation response signal in an odd frame to correct an excitation response signal in the next even frame or use a non-excitation response signal in an even frame to correct an excitation response signal in the next odd frame. Yet still another example can use a non-excitation response signal in one frame to correct a plurality of excitation response signals or to correct an excitation response signal in a frame inconsecutive to the frame of the non-excitation response signal.

In an embodiment of this specification, the main control circuit 18 obtains a corrected excitation response signal ˆS(with object) in a state where a sensing target object is present and a corrected excitation response signal ˆS(w/o object) in a state where the sensing target object is not present. The main control circuit 18 corrects the response signal ˆS(with object) with the response signal ˆS(w/o object). For example, the main control circuit 18 subtracts the response signal ˆS(w/o object) from the response signal ˆS(with object).

In some usage of an ultrasonic sensor device, the response signal ˆS(with object) may include fixed-pattern noise (FPN). The fixed-pattern noise can be effectively removed from the response signal ˆS(with object) with the response signal ˆS(w/o object).

Figure 10:
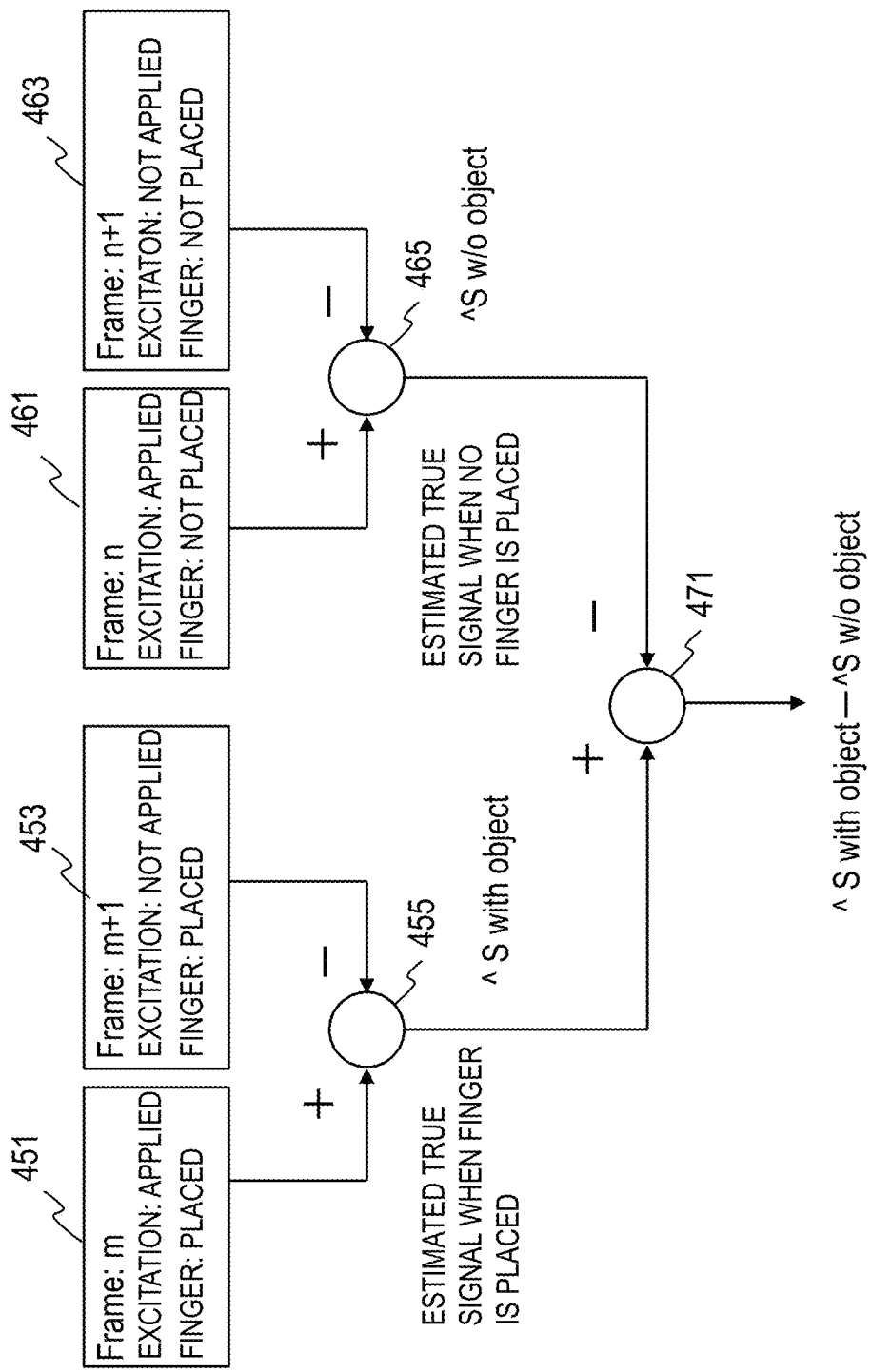
FIG. 10 is a diagram for illustrating a method of processing a response signal of a pixel to read a fingerprint that includes two-step correction.

FIG. 10 is a diagram illustrating a method of processing a response signal of a pixel to read a fingerprint. The processing includes the above-described two-step correction. In a frame m, the main control circuit 18 reads an excitation response signal from a pixel in a state where a finger is placed on the touch surface (451). In the next frame m+1, the main control circuit 18 reads a non-excitation response signal from the pixel in the state where the finger is placed on the touch surface (453). Further, the main control circuit 18 subtracts the non-excitation response signal from the excitation response signal to obtain a corrected excitation response signal ˆS(with object) in the state where the finger is placed on the touch surface (455).

In a frame n, the main control circuit 18 reads an excitation response signal from the pixel in a state where no finger is placed on the touch surface (461). In the next frame n+1, the main control circuit 18 reads a non-excitation response signal from the pixel in the state where no finger is placed on the touch surface (463). The frame n+1 can be prior to the frame m or the frame m+1 can be prior to the frame n. Further, the main control circuit 18 subtracts the non-excitation response signal from the excitation response signal to obtain a corrected excitation response signal ˆS(w/o object) in the state where no finger is placed on the touch surface (465).

Next, the main control circuit 18 subtracts the corrected excitation response signal ˆS(w/o object) in the state where no finger is placed on the touch surface from the corrected excitation response signal ˆS(with object) in the state where the finger is placed on the touch surface (471). The main control circuit 18 compares the fingerprint image acquired from this value with a fingerprint image stored beforehand to perform fingerprint authentication.

The sound pressure received by the ultrasonic fingerprint sensor device in the state where no finger is placed can be higher than the sound pressure in the state where a finger is placed. The sound pressure in the state where no finger is placed can be different depending on the excitation voltage for the ultrasonic transducer or whether a surface protection film is attached or not. Accordingly, the corrected response signal ˆS(with object) can be corrected more accurately with the corrected response signal ˆS(w/o object).

Figure 11A:
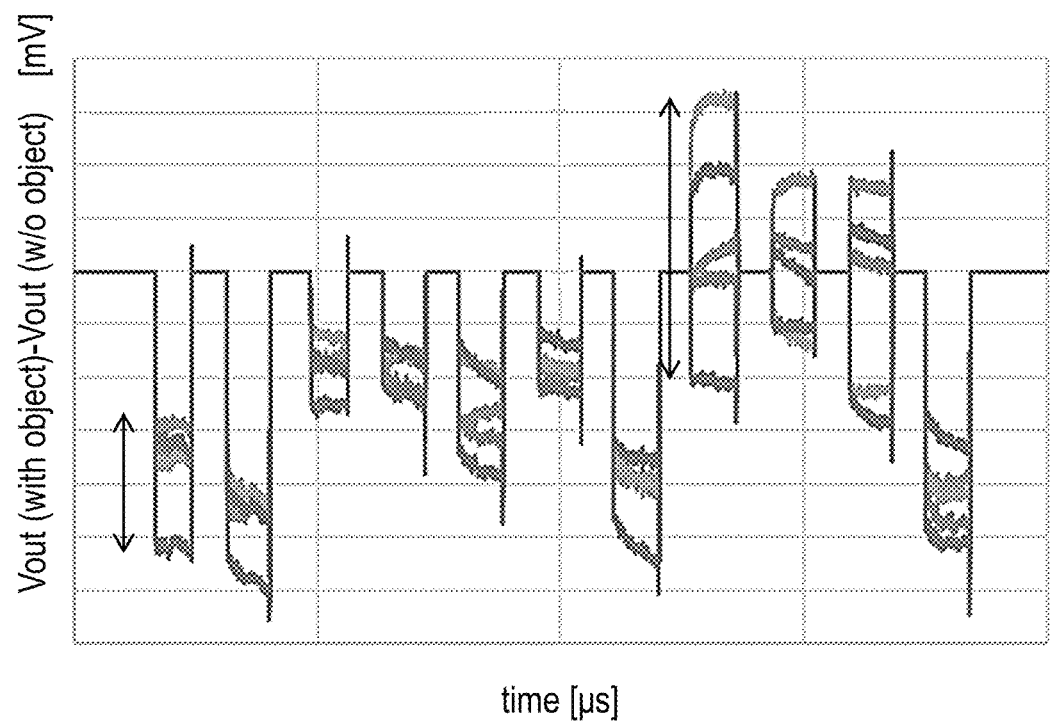
FIG. 11A provides results of a plurality of series of measurement about the difference between an excitation response signal Vout(with object) when a sensing target object is present and an excitation response signal Vout(w/o object) when the object is not present.

The effect of the correction of an excitation response signal with an non-excitation response signal is described. FIG. 11A provides results of a plurality of series of measurement about the difference between an excitation response signal Vout(with object) when a sensing target object is present and an excitation response signal Vout(w/o object) when the object is not present. The result of one series of measurement is the average of 1000 frames. The graph indicates the differences between excitation response signals of different pixel rows sequentially read from one data line. The horizontal axis of the graph represents time and the vertical axis represents the difference between excitation response signals. The difference is a value obtained by subtracting the value of the excitation response signal when the object is not present from the value of the excitation response signal when the object is present.

In FIG. 11A, different pulse groups are measured from different pixel rows (pixels) through one same data line. Each pulse is obtained from one pixel row in one series of measurement. Two pulse groups are provided with lines with arrows byway of example. Each line with arrows represents the variation among the measurement results from one pixel row. The variation is caused by low-frequency noise. As further indicated in FIG. 11A, the relation in signal intensity between Vout(with object) and Vout(w/o object) is different depending on the measurement in some pixel rows.

Figure 11B:
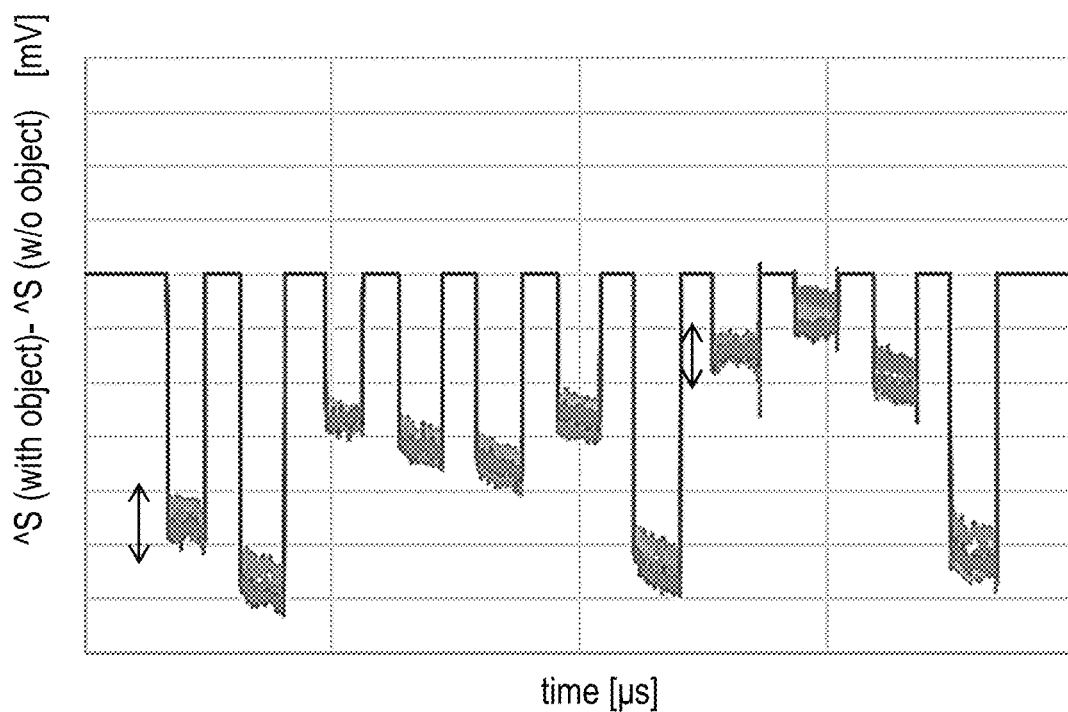
FIG. 11B provides results of a plurality of series of measurement about the difference between a corrected excitation response signal ^S(with object) when a sensing target object is present and a corrected excitation response signal ^S(w/o object) when the object is not present.

FIG. 11B provides results of a plurality of series of measurement about the difference between a corrected excitation response signal ˆS(with object) when a sensing target object is present and a corrected excitation response signal ˆS(w/o object) when the object is not present. The result of one series of measurement is the average of 1000 frames. The graph indicates the differences between corrected excitation response signals of different pixel rows sequentially read from one data line. The horizontal axis of the graph represents time and the vertical axis represents the difference between corrected excitation response signals. The difference is a value obtained by subtracting the value of the corrected excitation response signal when the object is not present from the value of the corrected excitation response signal when the object is present.

In FIG. 11B, different pulse groups are measured from different pixel rows (pixels) through one same data line. Each pulse is obtained from one pixel row in one series of measurement. Two pulse groups are provided with lines with arrows byway of example. Each line with arrows represents the variation among the measurement results from one pixel row. The variation is caused by low-frequency noise.

Compared to the measurement results in FIG. 11A, the variations or the low-frequency noise are significantly small. Specifically, the low-frequency noise decreased from 0.91 mVRMS to 0.2 mVRMS. As understood from these measurement results, the low-frequency noise can be effectively reduced by correcting an excitation response signal with a non-excitation response signal.

Adjustment of Period of Diode Biasing

Adjustment of the pulse width Tdb for biasing the diode D1 in the pixel circuit illustrated in FIG. 2 is described. When a finger is placed on the touch surface of a fingerprint sensor device, the ridges of a fingerprint are in contact with the touch surface and the grooves are away from the touch surface. The inventors' research revealed that the relation between the signal intensity in the region where the fingerprint (object) is in contact with the touch surface and the signal intensity in the region where it is away from the touch surface could vary depending on the pulse width Tdb.

More specifically, the value (ˆS(with object)−ˆS(w/o object)), or the difference in signal intensity between a region where a sensing target object is in contact with the touch surface and a region where the object is away from the touch surface, varies depending on the pulse width Tdb for biasing. When the pulse width Tdb is at a specific value, the region where the object is in contact with the touch surface shows a larger value and when the pulse width Tdb is at another specific value, the region where the object is in contact with the touch surface shows a smaller value.

The inventors' research revealed that the event that the value ˆS(with object)−ˆS(w/o object)) varies is strongly correlated with the corrected excitation response signal ˆS(w/o object) when the sensing target object is not present.

Figure 12:
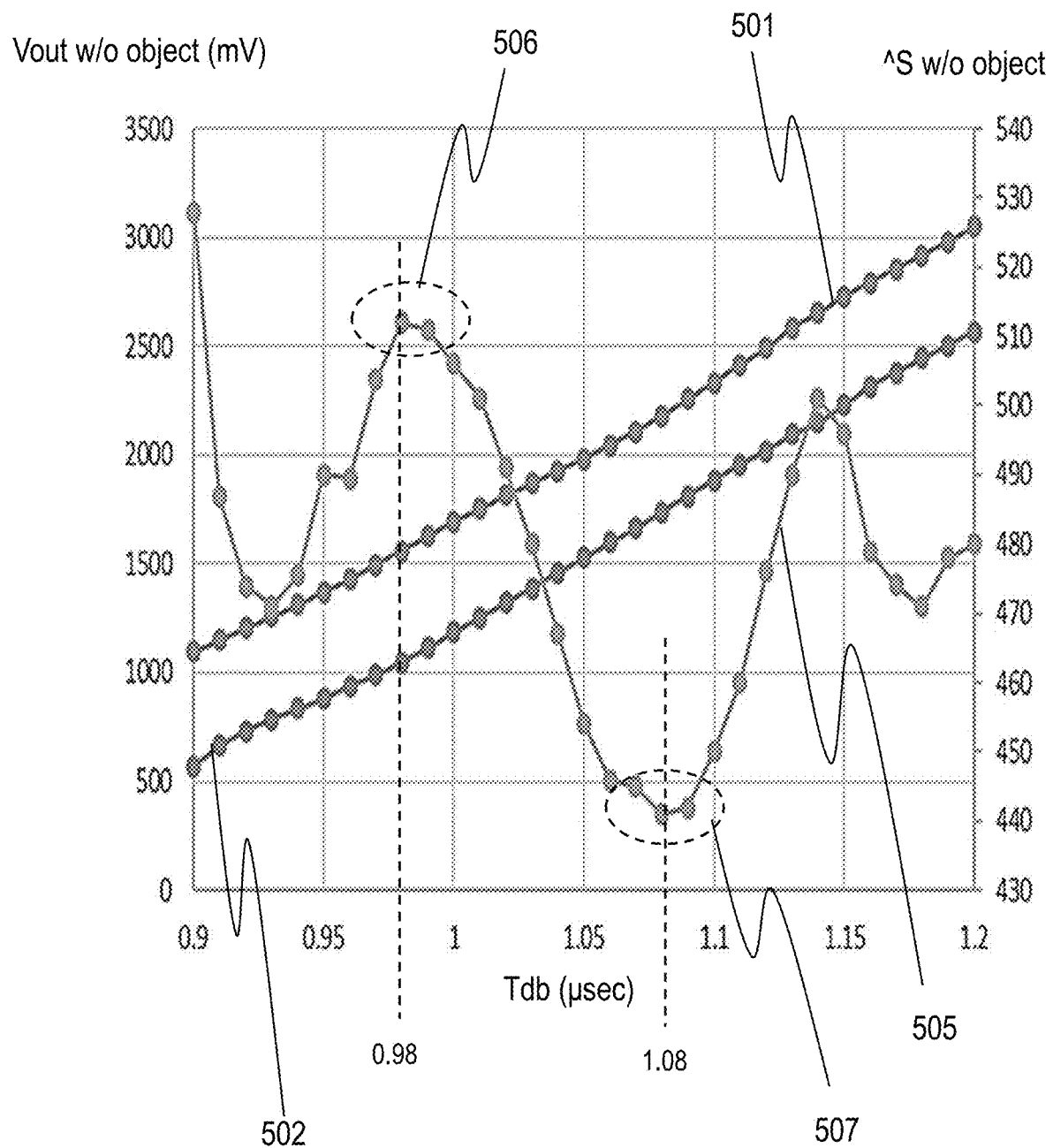
FIG. 12 provides measurement results about the relations between a bias pulse width Tdb and some signals including ^S(w/o object).

FIG. 12 provides measurement results about the relations between the bias pulse width Tdb and some signals including ˆS(w/o object). The horizontal axis of the graph represents the bias pulse width Tdb. The vertical axis on the left represents the response signal Vout(w/o object) from a pixel when a sensing target object is not present and the vertical axis on the right represents the corrected excitation response signal ˆS(w/o object) from a pixel when the sensing target object is not present.

In the graph of FIG. 12, the line 501 represents the excitation response signal when the sensing target object is not present and the line 502 represents the non-excitation response signal when the sensing target object is not present. The curve 505 represents the corrected excitation response signal ˆS(w/o object) when the sensing target object is not present.

The signal ˆS(w/o object) increases and decreases with increase of the bias pulse width Tdb to show a local maximum and a local minimum. For example, the region 506 surrounded by a dashed line is a region including the local maximum (@Tdb=0.98) and the region 507 surrounded by a dashed line is a region including the local minimum (@Tdb=1.08).

When Tdb=0.98 at which the signal ˆS(w/o object) takes a local maximum, the value (ˆS(with object)−ˆS(w/o object) indicated that the signal in the region where the sensing target object is in contact with the touch surface is smaller than the signal in the region where the object is away from the touch surface. When Tdb=1.08 at which the signal ˆS(w/o object) takes the local minimum, the value (ˆS(with object)−ˆS(w/o object) indicated that the signal in the region where the sensing target object is in contact with the touch surface is larger than the signal in the region where the object is away from the touch surface.

In the inventors' experiment, an accurate fingerprint image was acquired around these extrema. In contrast, at an intermediate value far from these extrema, for example when Tdb=1.03, an accurate fingerprint image was not acquired. That is to say, identifying the extrema of the signal ˆS(w/o object) and selecting a value for Tdb from a predetermined range enable acquisition of an accurate image of an object.

In an embodiment of this specification, the main control circuit 18 determines the bias pulse width Tdb based on the signal ˆS(w/o object). The main control circuit 18 measures the relation between the signal ˆS(w/o object) and the bias pulse width Tdb and identifies an extremum. The main control circuit 18 selects a value for the bias pulse width Tdb from a range predetermined based on the extremum.

The signal ˆS(w/o object) increases and decreases with increase of the bias pulse width Tdb and oscillates in a certain cycle as shown in FIG. 12. The oscillation cycle of the signal ˆS(w/o object) in FIG. 12 is 0.2 μsec. The inventors found that the oscillation cycle of the signal ˆS(w/o object) becomes the same as the cycle of the excitation. FIG. 12 provides the results when the cycle of excitation was actually 0.2 sec and the frequency was 5 MHz. Accordingly, to measure the relation between the signal ˆS(w/o object) and the bias pulse width Tdb and identify the local maximum and the local minimum, it is necessary to measure the signal ˆS(w/o object) while varying the bias pulse width Tdb for at least a time of a half of the cycle of excitation.

Figure 13:
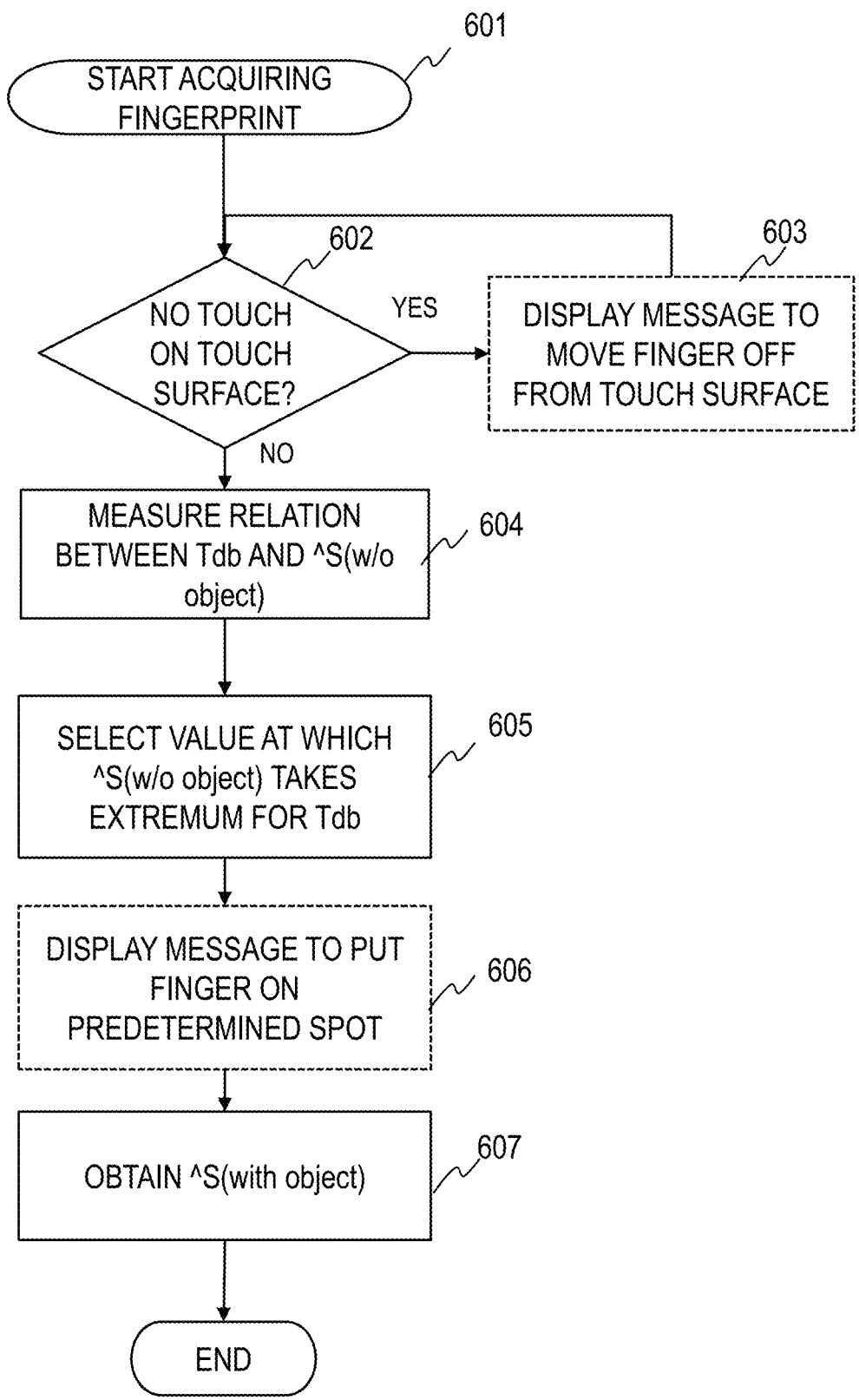
FIG. 13 is a flowchart of an example of a method of controlling a fingerprint sensor device.
Figure 14:
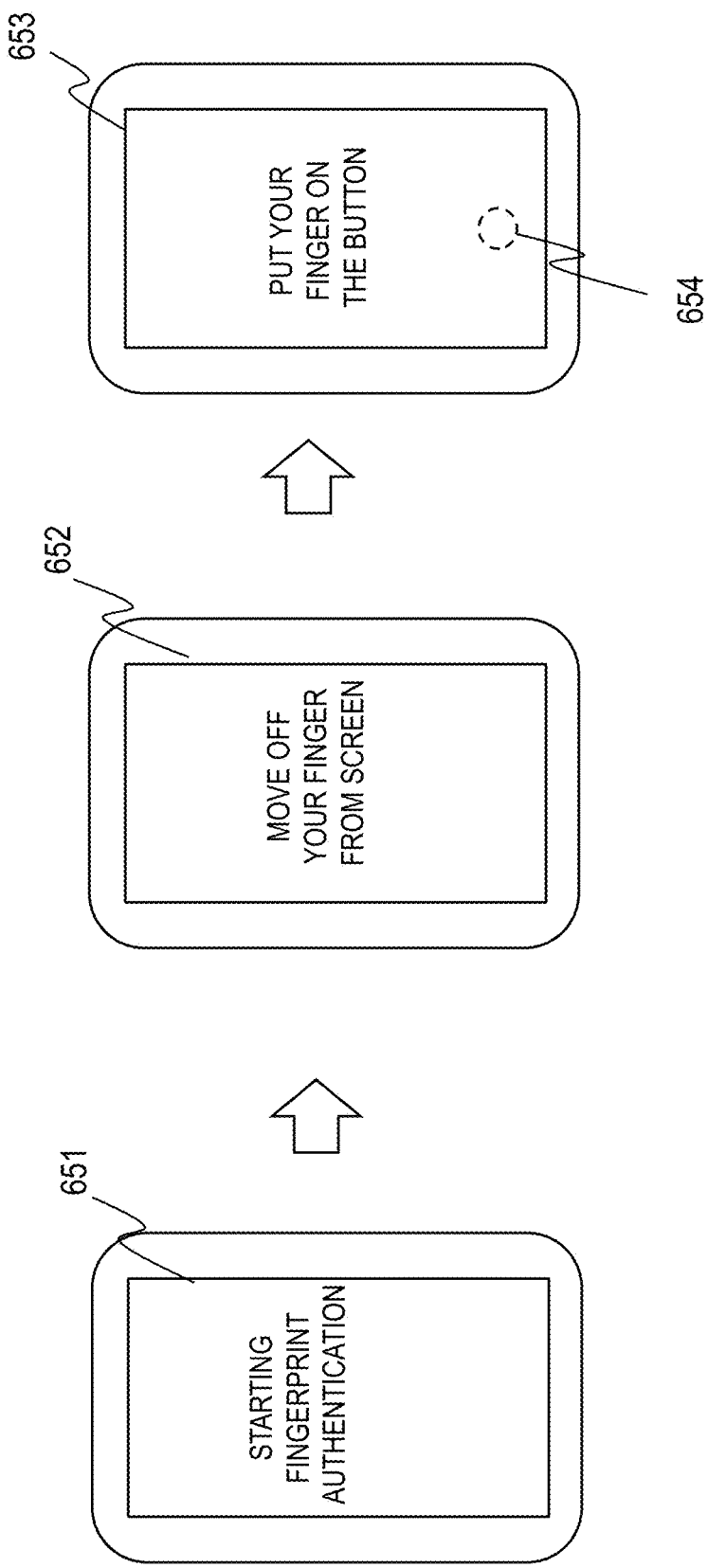
FIG. 14 schematically illustrates examples of images displayed in some steps of the process flow illustrated in FIG. 13.

FIG. 13 is a flowchart of an example of a method of controlling a fingerprint sensor device. As illustrated in FIG. 3, the fingerprint sensor device can be included in a terminal including a touch panel 32 and a display panel 31. FIG. 14 schematically illustrates examples of images displayed in some steps of the process flow illustrated in FIG. 13.

As illustrated in FIG. 13, when the main control circuit 18 detects an event to start acquiring a fingerprint (601), it determines whether the touch surface is touched by a sensing target object such as a finger (hereinafter, assuming that the object is a finger) (602). In FIG. 14, the displayed image 651 provides information notifying the user of start of fingerprint authentication. This is an example of the event to start acquiring a fingerprint. The main control circuit 18 can determine whether a finger is in contact with the touch surface through a signal from the touch panel 32.

If the touch surface is touched by a finger (602: YES), the main control circuit 18 displays a message on the display panel 31, instructing the user to move the finger off from the touch surface (603). The displayed image 652 in FIG. 14 is an example of this message.

If the touch surface is not touched by a finger (602: NO), the main control circuit 18 measures the relation between the bias pulse width Tdb and the signal ˆS(w/o object) (604). For example, the main control circuit 18 acquires the signal ˆS(w/o object) for a plurality of times while varying the bias pulse width Tdb and calculates an average of the signal ˆS(w/o object) at each value of the bias pulse width Tdb.

Next, the main control circuit 18 identifies a value of the bias pulse width Tdb at which the signal ˆS(w/o object) takes an extremum and sets the value to the bias pulse width Tdb (605). The bias pulse width Tdb can be a value at which the signal ˆS(w/o object) takes a value close to the extremum.

Next, the main control circuit 18 displays a message on the display panel 31 and instructs the user to put a finger on a predetermined spot 654 (606). The displayed image 653 in FIG. 14 is an example of this message. Next, the main control circuit 18 controls the pixels with the selected bias pulse width Tdb and obtains a corrected excitation response signal ˆS(with object) in the state where an object (finger) is present (607).

Separate Driving

Figure 15:
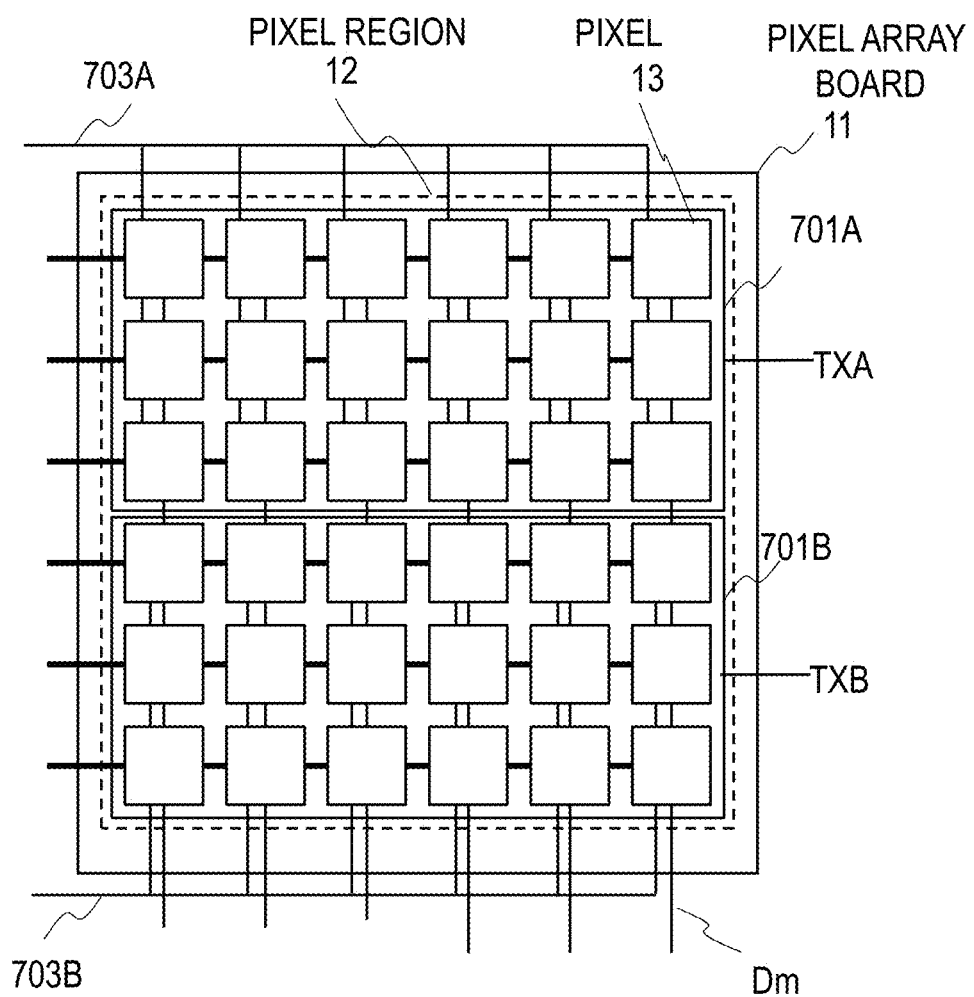
FIG. 15 schematically illustrates a configuration example of a pixel region separated into two subregions.

Separate driving of the pixel region 12 is described. In an embodiment of this specification, the ultrasonic sensor device 10 separates the pixel region 12 into a plurality of subregions and controls the subregions separately. FIG. 15 schematically illustrates a configuration example of a pixel region 12 separated into two subregions. Each subregion is a pixel group composed of a plurality of pixels. The number of subregions can be selected desirably. In an embodiment of this specification, the common electrode for the piezoelectric elements and the diode bias line are separated for individual subregions and they are driven individually. In this configuration example, the upper electrodes for all pixels included in one pixel group are parts of one common electrode and the diode bias line for a pixel group are shared by all pixels in the pixel group.

FIG. 15 illustrates common electrodes 701A and 701B and diode bias lines 703A and 703B separate for the two subregions. The upper electrode 166 of each pixel in one subregion is a part of the common electrode 701A and the upper electrode 166 of each pixel in the other subregion is a part of the common electrode 701B. As described above, the common electrodes 701A and 701B are individually supplied with an excitation signal. The diode bias lines 703A and 703B individually transmit a diode bias potential.

The driver circuit for supplying an excitation signal can be prepared separately for the common electrodes 701A and 701B. Alternatively, the output from one driver circuit can be switched between the common electrodes 701A and 701B. The diode bias lines 703A and 703B for the two subregions are separate to be driven individually. This configuration reduces the capacitance in the common electrodes (sending electrodes) of the pixels and the diode bias lines to achieve a lower driving load. As a result, upsizing the device becomes easily achievable. Only either the diode bias line or the common electrode can be separated for the subregions.

Figure 16:
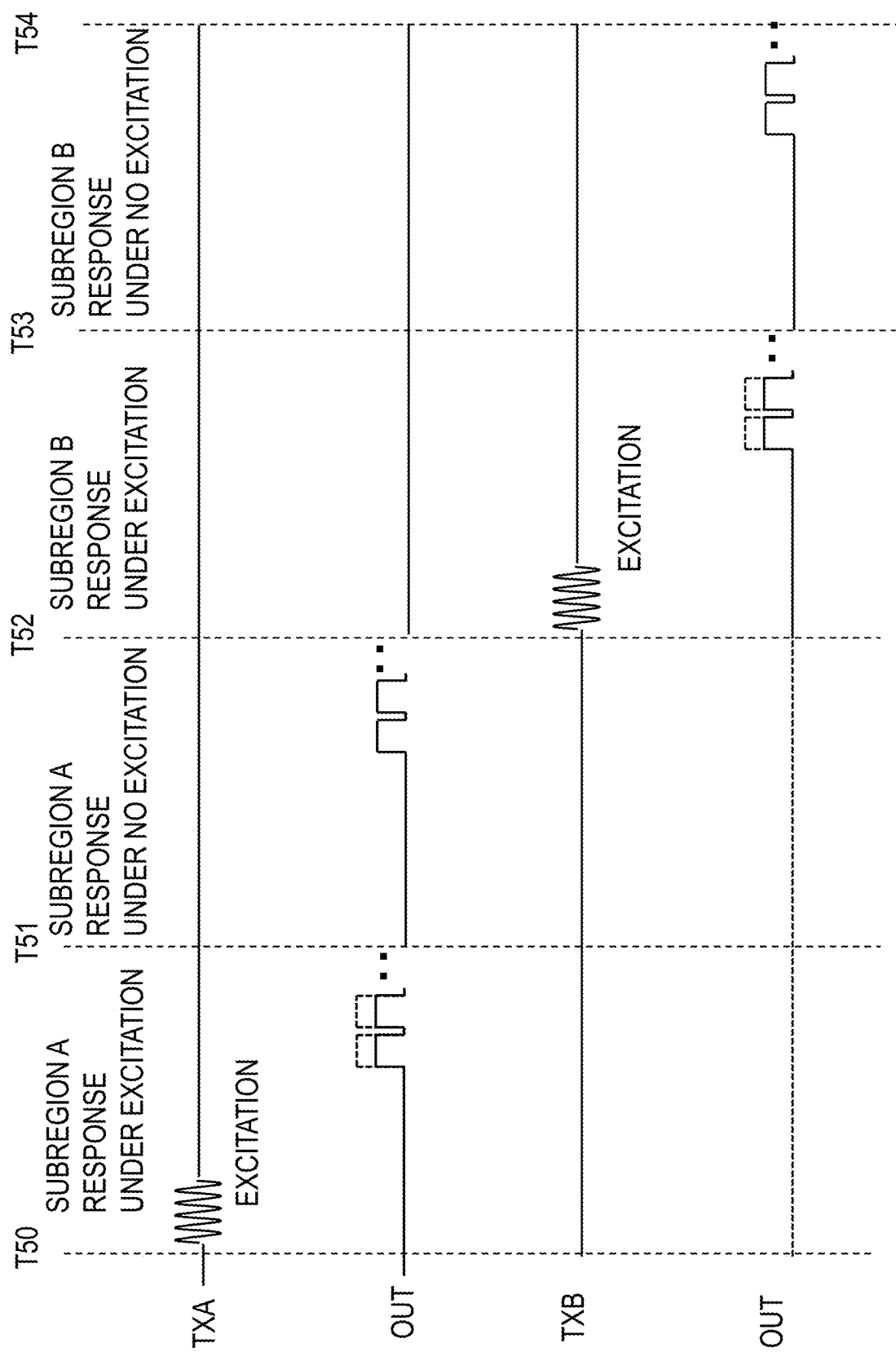
FIG. 16 is a sequence diagram illustrating an example of the method of driving a separated pixel region.

FIG. 16 is a sequence diagram illustrating an example of the method of driving a separated pixel region. FIG. 16 schematically illustrates excitation signals for the sending electrodes (common electrodes) TXA and TXB in the pixel region separated into two subregions and response signals from pixels in the subregions.

In the period (frame) from a time T50 to a time T51, the main control circuit 18 supplies an excitation signal to the sending electrodes TXA in the first subregion A and sequentially reads excitation response signals of the pixels in the subregion A. Response signals from the subregion B are not read out. The processing on the first subregion A in this frame is the same as the processing described with reference to FIGS. 2 and 8 for the frame including excitation.

In the next period (frame) from the time T51 to a time T52, the main control circuit 18 sequentially reads non-excitation response signals of the pixels in the first subregion A without supplying an excitation signal to the sending electrodes TXA in the subregion A. Response signals from the subregion B are not read out. The processing on the first subregion A in this frame is the same as the processing described with reference to FIG. 8 for the frame not including excitation.

In the period (frame) from the time T52 to a time T53, the main control circuit 18 supplies an excitation signal to the sending electrodes TXB in the second subregion B and sequentially reads excitation response signals of the pixels in the subregion B. Response signals from the subregion A are not read out. The processing on the second subregion B in this frame is the same as the processing described with reference to FIGS. 2 and 8 for the frame including excitation.

In the next period (frame) from the time T53 to a time T54, the main control circuit 18 sequentially reads non-excitation response signals of the pixels in the second subregion B without supplying an excitation signal to the sending electrodes TXB in the subregion B. Response signals from the subregion A are not read out. The processing on the second subregion B in this frame is the same as the processing described with reference to FIG. 8 for the frame not including excitation. The processing in these four frames is repeatedly executed.

The above-described example acquires non-excitation response signals and excitation response signals from one subregion using two consecutive frames and performs the same operation on the other subregion using other two consecutive frames. Another example can read excitation response signals from one subregion and non-excitation response signals from the other subregion in one frame. In this case, data lines of the pixel columns are provided separately for the subregions.

For example, the main control circuit 18 supplies an excitation signal to the sending electrodes TXA in the first subregion A and does not supply an excitation signal to the sending electrodes TXB in the second subregion B in a first frame. Thereafter, the main control circuit 18 sequentially reads excitation response signals from the pixels in the subregion A and also sequentially reads non-excitation response signals from the pixels in the subregion B.

In the next frame, the main control circuit 18 supplies an excitation signal to the sending electrodes TXB in the second subregion B and does not supply an excitation signal to the sending electrodes TXA in the first subregion A. Thereafter, the main control circuit 18 sequentially reads the non-excitation response signals from the pixels in the subregion A and also sequentially reads the excitation response signals from the pixels in the subregion B.

As set forth above, embodiments of this disclosure have been described; however, this disclosure is not limited to the foregoing embodiments. Those skilled in the art can easily modify, add, or convert each element in the foregoing embodiments within the scope of this disclosure. Apart of the configuration of one embodiment can be replaced with a configuration of another embodiment or a configuration of an embodiment can be incorporated into a configuration of another embodiment.

What is claimed is:

1. An ultrasonic sensor device comprising:
   a plurality of pixels each including an ultrasonic transducer; and
   a control circuit configured to control the plurality of pixels,
   wherein each of the plurality of pixels is configured to hold a signal received by the ultrasonic transducer therein and send the signal to the control circuit as a response signal, and
   wherein the control circuit is configured to:
      acquire an excitation response signal, which is a response signal sent from a pixel after the ultrasonic transducer therein is excited;
      acquire a non-excitation response signal, which is a response signal sent from a pixel when the ultrasonic transducer therein is not excited; and
      correct the excitation response signal based on the non-excitation response signal.

2. The ultrasonic sensor device according to claim 1, wherein the control circuit is configured to:
   acquire a first excitation response signal and a first non-excitation response signal in a state where a sensing target object is present;
   correct the first excitation response signal based on the first non-excitation response signal;
   acquire a second excitation response signal and a second non-excitation response signal in a state where the sensing target object is not present;
   correct the second excitation response signal based on the second non-excitation response signal; and
   determine an excitation response signal caused by the sensing target object based on a comparison result of the corrected first excitation response signal with the corrected second excitation response signal.

3. The ultrasonic sensor device according to claim 1, wherein the control circuit is configured to:
   control the plurality of pixels to acquire a response signal from each pixel in each of a plurality of consecutive frames;
   acquire an excitation response signal in one of two consecutive frames; and
   acquire a non-excitation response signal in the other one of the two consecutive frames.

4. The ultrasonic sensor device according to claim 1,
   wherein each of the plurality of pixels includes a diode whose cathode is connected to an output node of the ultrasonic transducer, and
   wherein the control circuit is configured to:
      supply a bias pulse to the cathode of the diode after exciting the ultrasonic transducer;
      acquire a third excitation response signal and a third non-excitation response signal in a state where a sensing target object is not present; and
      adjust a pulse width for the bias pulse based on a difference between the third excitation response signal and the third non-excitation response signal.

5. The ultrasonic sensor device according to claim 4, wherein the control circuit is configured to:
   acquire differences between third excitation response signals and third non-excitation response signals under different pulse widths of bias pulses;

identify a relation between the pulse widths of the bias pulses and the differences between the third excitation response signals and the third non-excitation response signals;
identify an extremum in the relation; and
select a pulse width for the bias pulse from a range predetermined based on the extremum.

6. The ultrasonic sensor device according to claim 1,
wherein the plurality of pixels are separated into a plurality of pixel groups,
wherein each of the plurality of pixel groups is composed of one or more pixels,
wherein the ultrasonic transducer is a piezoelectric element including a piezoelectric material layer and two electrodes sandwiching the piezoelectric material layer,
wherein one of the electrodes of each ultrasonic transducer in each pixel group is a part of one common electrode in the pixel group, and
wherein the common electrodes of different pixel groups are separate from each other and configured to be controlled individually.

7. The ultrasonic sensor device according to claim 6,
wherein each of the plurality of pixels includes a diode whose cathode is connected to an output node of the ultrasonic transducer, and
wherein diode bias lines separate for the plurality of pixel groups are laid out in the plurality of pixel groups.

8. A method of controlling an ultrasonic sensor device including a plurality of pixels each including an ultrasonic transducer, the method comprising:
acquiring an excitation response signal, which is a response signal sent from a pixel after the ultrasonic transducer therein is excited;
acquiring a non-excitation response signal, which is a response signal sent from the pixel when the ultrasonic transducer therein is not excited; and
correcting the excitation response signal based on the non-excitation response signal.

\* \* \* \* \*